May 12, 1970   HANS-JOACHIM M. FORSTER   3,511,115
INSTALLATION FOR THE CONTROL OF AUTOMATIC TRANSMISSIONS
OF MOTOR VEHICLES
Filed Feb. 29, 1968
FIG. I
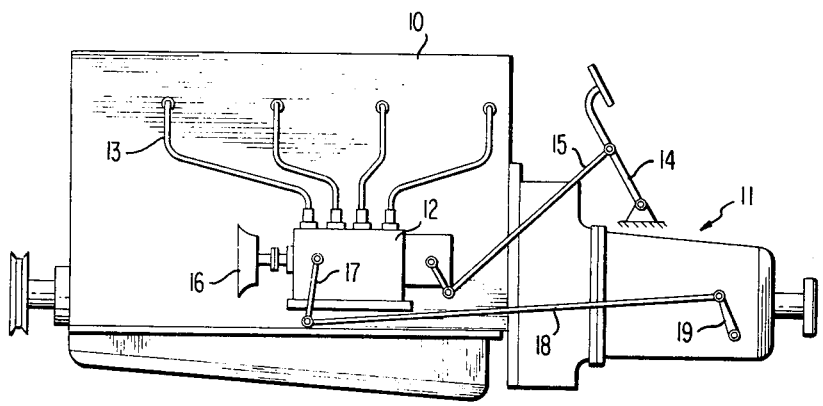
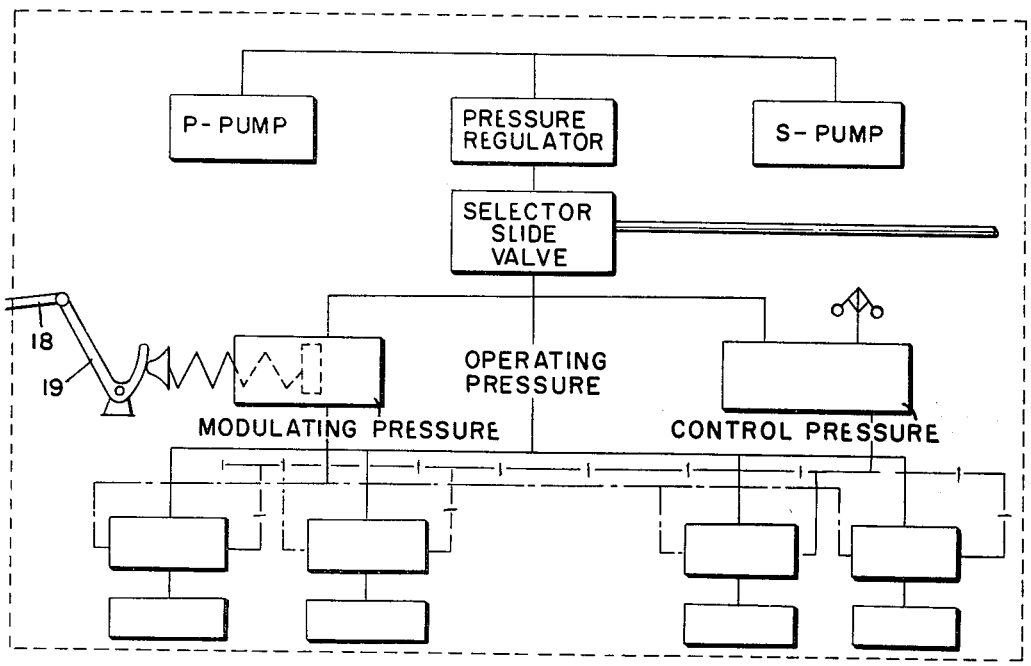
FIG. 2
INVENTOR
HANS-JOACHIM M. FORSTER
BY *Craig & Antonelli*
ATTORNEYS

United States Patent Office 3,511,115
Patented May 12, 1970

3,511,115
INSTALLATION FOR THE CONTROL OF AUTOMATIC TRANSMISSIONS OF MOTOR VEHICLES
Hans-Joachim M. Forster, Stuttgart-Riedenberg, Germany, assignor to Daimler-Benz Aktiengesellschaft, Stuttgart-Unterturkheim, Germany
Filed Feb. 29, 1968, Ser. No. 709,370
Claims priority, application Germany, Mar. 3, 1967, D 52,430
Int. Cl. F02d 1/12; B60k 21/00
U.S. Cl. 74—861                              4 Claims

ABSTRACT OF THE DISCLOSURE

An installation for the control of automatically shifted motor vehicle transmissions in which the shifting pulses are controlled, among other factors, in dependence on the torque of the driving engine and in which the position of the control rack of the injection pump serves as the measure for the torque of an injection-type internal combustion engine.

BACKGROUND OF THE INVENTION

The present invention relates to an installation for the control of automatically shifted motor vehicle change-speed transmissions in which the shifting pulses are controlled, inter alia, in dependence on the torque of the driving engine.

Automatically shifting motor vehicle change-speed transmissions are shifted generally in dependence on two influencing magnitudes. One influencing magnitude, for the most part, is the vehicle velocity and the other influencing magnitude, as mentioned above, is the torque of the driving engine. As a rule, either the position of the gas pedal or the vacuum in the suction pipe of the engine is used as measure for the torque of the driving engine. However, it has been found that with engines, which cooperate with an injection installation, the two known magnitudes are not suited as transmitters or indicators for the torque because the fuel quantity is also changed by other regulating factors, for example, by the temperature, the rotational speed, and the altitude without either of the mentioned, known magnitudes used heretofore being able to change.

SUMMARY OF THE INVENTION

The present invention aims at eliminating these disadvantages and serves the underlying problems with installations of the type described above in that the position of the control rack of the injection pump serves as measure for the torque with injection-type internal combustion engines. This concept of the present invention may be used both with gasoline injection-type engines as also with diesel engines.

The aforementioined disadvantages are avoided by the installation according to the present invention. The other control magnitudes, which influence the fuel quantities, are incorporated in this manner in the control system. One now again obtains a nearly unequivocal measure for the torque of the driving engine so that the automatic transmission is able to get along, without further corrections, with a normal shifting program in the known manner.

The present invention further proposes that the control rack of the injection pump is connected by way of a transmitting member with that control member of the control installation of the transmission which triggers the pulses dependent on the torque. In general, the transmission member is constructed as mechanical linkage. However, depending on the type of the control installation present in the transmission, also other transmitting means, for example, hydraulic and pneumatic transmitting means as well as electrical transmitting means are suited for the present invention.

Automatically shifting motor vehicle change-speed transmissions operate as a rule with a hydraulic control installation which triggers the shifting means in dependence on pressure. In connection therewith, the present invention proposes that the injection pump is connected by way of a transmitting member with the modulating pressure transmitter of the control installation. For example, a mechanical linkage may be utilized therefor for the tensioning or stressing of the spring acting upon the modulating pressure transmitter.

Accordingly, it is an object of the present invention to provide an installation for the control of automatic change-speed transmissions of motor vehicles which is simple in construction and effectively avoids the aforementioned shortcomings and drawbacks encountered in the prior art.

Another object of the present invention resides in a control installation for the control of automatic transmissions which is applicable to injection-type engines.

A further object of the present invention resides in a control installation for automatic transmissions which permits shifting control of the transmission in such a manner as to take into consideration at any given time all regulating factors affecting the operation of the engine such as, temperature, rotational speed and altitude of the vehicle.

Still a further object of the present invention resides in a control system for controlling automatic transmissions which can be used without further corrections in a conventional shifting program.

These and further objects, features, and advantages of the present invention will become more obvious from the following description when taken in connection with the accompanying drawing which shows, for purposes of illustration only, one embodiment in accordance with the present invention and wherein:

FIG. 1 is a schematic elevational view of a shifting installation in accordance with the present invention; and FIG. 2 is a schematic representation showing only the principal parts of a gear shifting unit in accordance with the present invention.

Referring now to the drawing, reference numeral 10 designates therein a conventional driving engine of the injection type for a motor vehicle. The automatic transmission generally designated by reference numeral 11 is connected, for example, flangedly connected, as a unit to the engine block. The driving engine 10 is a gasoline injection-type engine. The injection lines 13 lead from the injection pump 12 of conventional construction to the suction pipes (not shown) of the engine.

The control rack (not shown) of the injection pump 12 is actuated indirectly by way of a linkage 15 from the gas pedal 14. On this control rack act still other influencing magnitudes such as, for example, the air pressure which adjusts the control rack by means of a barometric box 16 in dependence on the geodetic height of the vehicle even with the same position of the gas pedal 14.

The control rack of the injection pump 12 is connected by a lever 17 and a linkage 18 with a lever 19 which, in turn, is arranged at the housing of the automatic transmission generally designated by reference numeral 11. The lever 19 influences in the control installations of the automatic transmission 11 that control member of conventional construction which triggers the pulses dependent on the torque. In the instant case, the hydraulic control installation of the transmission operates with a modulated pressure, i.e., with a pressure that is modulated corresponding to the engine torque. This modulated pressure acts on the individual command slide valves against another pressure dependent on the driving velocity.

The modulation pressure transmitter in the control installation of the vehicle is now influenced by the lever 19. This can take place in a simple and conventional manner in that the lever 19 stresses more or less the spring, which acts on the modulating pressure transmitter, in dependence on the position of the control rack. A modulating pressure is produced in this manner which is dependent on the position of the control rack and therewith on the torque of the driving engine 10.

While I have shown and described only one embodiment in accordance with the present invention, it is obvious that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An installation for the control of an automatically shifting change-speed transmission for motor vehicles in which the shifting pulses are controlled, inter alia, in dependence on the torque of the driving engine, wherein the improvement comprises injection pump means having control rack means for an injection-type internal combustion engine, and further means operatively connecting the control rack means with the transmission so that the position of the control rack means of the injection pump means serves as measure for the torque of the engine.

2. An installation according to claim 1, further comprising a transmission control installation having control members, and wherein the control rack means of the injection pump means is operatively connected by way of transmitting means with that control member of the transmission control installation which triggers the pulses dependent on the torque.

3. An installation according to claim 1, further comprising a hydraulic control installation for the transmission having means for triggering the shifting operation in dependence on the pressure including modulating pressure transmitter means, said injection pump means being operatively connected with the modulating pressure-transmitting means.

4. An installation according to claim 2, having a hydraulic control installation for the transmission with means for triggering the shifting operation in dependence on the pressure and including modulating pressure transmitter means, said injection pump means being operatively connected with the modulating pressure-transmitting means.

References Cited

UNITED STATES PATENTS

| | | | |
|---|---|---|---|
| 2,178,356 | 10/1939 | Brunner | 74—857 |
| 2,721,072 | 10/1955 | Zuhn et al. | |
| 3,204,719 | 9/1965 | Grozinger | 74—873 X |

FOREIGN PATENTS

| | | |
|---|---|---|
| 1,016,572 | 2/1955 | Germany. |

ARTHUR T. McKEON, Primary Examiner